INVENTOR.
HAROLD A. QUIST
BY
Robert O. Spindle
ATTORNEY

Nov. 5, 1957 H. A. QUIST 2,811,980
BREATHER VALVE
Filed March 11, 1954 4 Sheets-Sheet 2

INVENTOR.
HAROLD A. QUIST
BY
ATTORNEY

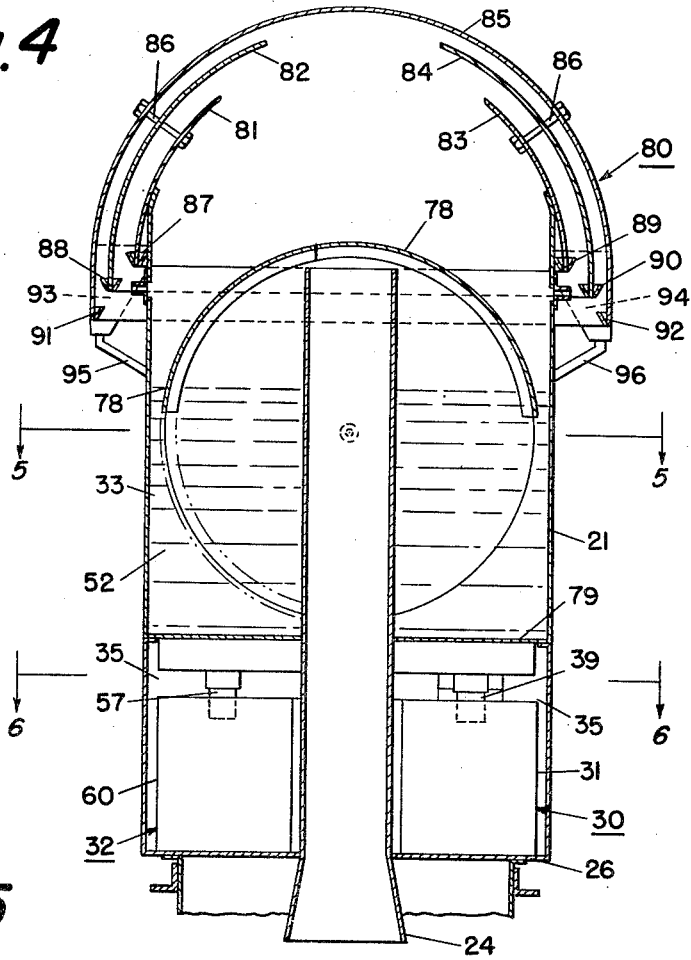
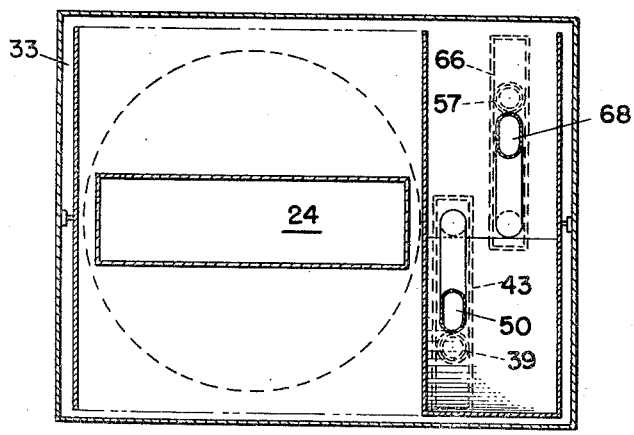

Nov. 5, 1957     H. A. QUIST     2,811,980
BREATHER VALVE

Filed March 11, 1954     4 Sheets-Sheet 4

INVENTOR.
HAROLD A. QUIST
BY
Robert O. Spindle
ATTORNEY

_United States Patent Office_

2,811,980
Patented Nov. 5, 1957

2,811,980

BREATHER VALVE

Harold A. Quist, Swarthmore, Pa., assignor to Sun Oil Company, Philadelphia, Pa., a corporation of New Jersey Application March 11, 1954, Serial No. 415,659

1 Claim. (Cl. 137—248)

This invention relates in general to venting devices for liquid storage tanks and specifically to pressure operated relief valves of the liquid-sealed oscillating type, responsive to either pressure or vacuum conditions in storage vessels.

A valve of this type to be satisfactory must be balanced in the normal sealing position unaffected by pressure until either vacuum or pressure conditions require relief. When required to vent either condition, concentration of these forces existing in the storage vessl must be strictly contained and allowed to escape only within predetermined force ranges. On being relieved, all actuating pressures should be promptly removed from the valve to permit immediate and complete resealing of the vessel. Further, the external forces, particularly the effect of the vented pressure gases, must be removed from the locus of relief to permit this prompt resealing action. Finally, the successful recapture of entrained sealing liquid especially during the pressure relief operation and returning the same to the valve chamber keeps the efficiency high and reduces maintenance.

Elements cooperating to achieve these results are illustrated in my Patent Number 2,697,443, dated December 21, 1954, and Patent Number 2,710,625, dated June 14, 1955. These elements selected and combined here with additional elements are shown in those applications in relation with other mechanisms operating for purposes similar to those disclosed here.

A primary object of this invention is to provide a simplified device for venting pressure vessels of better operating characteristics, and one more easily and inexpensively manufactured and maintained.

It is an additional object of this invention to provide an oscillating relief valve which is free of pressure effect in the sealing position yet spontaneously operates to a venting position to relieve controlled ranges of pressure or vacuum as they accumulate in a storage vessel.

Further, it is an object to provide a valve of this type which is assured prompt, sharp action by minimizing the retarding effect created by the vented pressure gases.

It is another object of this invention to recapture and return entrained sealing liquid from pressure vented gases to the body of the sealing liquid in operating position to maintain the valve operation at constant, high efficiency and reduce maintenance requirements.

In accordance with the present invention an oscillatory valve member is axially supported in a housing in position to contact a body of liquid in sealing relation. The valve member normally assumes a closed, sealing position in perfect balance subjected only to atmospheric pressure which is maintained both internally and externally of the valve moving or driving mechanism.

Further, the structure of the device is such as to pressure connect the valve moving member to separate liquid sealed pressure and vacuum actuators only when pressure or vacuum conditions of predetermined force accepted as requiring relief arise in the storage vessel. Until one or the other of these conditions exists at this predetermined force there is no transmission of pressure or vacuum to actuate the valve member, and balance is assured by surrounding the valve moving mechanism with existing atmospheric conditions.

When the valve member responds to vent either of the two conditions requiring relief, operation is assisted by an improved hood for the valve housing. The immediate release of the pressure gases at the locus of the valve during the venting operation accentuates the rapidity of response, for both opening and closing, thereby improving the operating characteristics. Further, the shape of the hood protects the interior of the valve from the elements and foreign bodies and accumulates gas entrained sealing fluid for return to the body of that liquid.

The invention lies in the features of construction, combination and arrangement of parts, subsequently fully described and claimed, in which description reference is made to the figures of the drawing as follows:

Figure 4 is a sectional elevational view taken on line 4—4 of Figure 3.

Figure 5 is a sectional view taken on line 5—5 of Figure 4.

The general requirements of all vacuum venting and pressure relieving combinations are that they preserve the storage facilities and conserve as much of the stored, volatile material as possible. To do this efficiently, the vent valve responses must be positive, spontaneous, and performed only under selected and carefully predetermined conditions. The operating limits of such devices to perform functions of both safety and conservation under such widely differing conditions of pressure (positive) and vacuum (negative) are very narrow. Positive control of both conditions is a major requirement. Further, decrease of all counter forces to a minimum effect is necessary to insure proper valve operation in response to this positive control.

Then the successful operation of a relief valve such as is described here requires complete balance in the sealed position and prompt relieving action when necessary. Additionally, once the relieving operation is started, complete, uninterrupted response is the measure of proper action. These characteristics are present in the described mechanism because of the combination of the separate vacuum-pressure actuators transmitting relief conditions through a shielded and normally balanced valve member only when predetermined forces exist.

Unless otherwise defined, the terms "pressure" and "vacuum" are used to indicate pressure ranges, respectively, above and below atmospheric pressure. The relief of these conditions arising in storage vessels is limited to excesses of positive and negative pressures. This is clear when it is understood that due to pumping operations and temperature changes, to name two affecting conditions, there is always a pressure existing in a sealed storage vessel either above or below atmospheric pressure, frequently not of sufficient force to require relief. A balanced or normal pressure exactly equal externally and internally of the storage vessel is the exception, not the rule.

Figure 1:
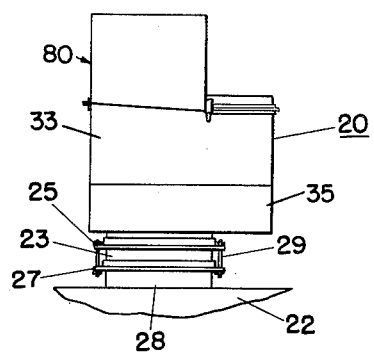
Figure 1 is an elevational view of the device in the operating position.

Referring now to the drawing for a more detailed description of the invention where like numerals designate like elements throughout the figures, Figure 1 shows the device mounted on the top of a storage vessel ready for the relieving operation. A pressure relief system generally indicated by the numeral 20 is mounted above a storage vessel 22 shown as clamped to a conventional manhole 28 as one acceptable way of fastening it. Other and more varied methods of mounting the valve housing in operating connection with the vapor or pressure space of the storage vessel 22 are readily visualized. Any of these may be acceptable, uninterrupted transmission of the relieving gases from and to the tank through the valve, during the relieving operation, being the only requirement.

As one acceptable securing means, a collar 23 forms a chimney between the storage vessel 22 and the housing 21 of the system 20. Flanges 25 and 27 form the opposed connecting means held in spaced relation by stiffening bolts 29 placed peripherally around the manhole 28. By such construction, a strong, rigid connection is made properly spaced to transmit the operating forces to the valve housing.

Figure 2:
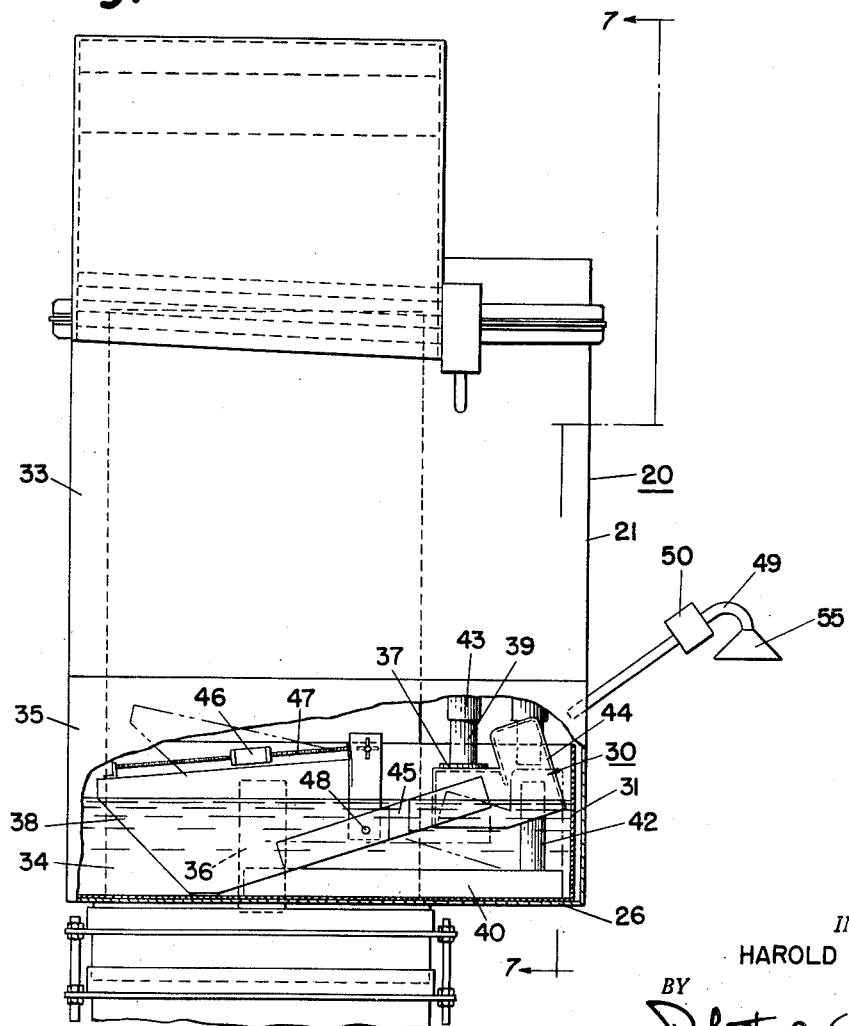
Figure 2 is a side elevational view partially broken away to show some of the operating details.
Figure 3:
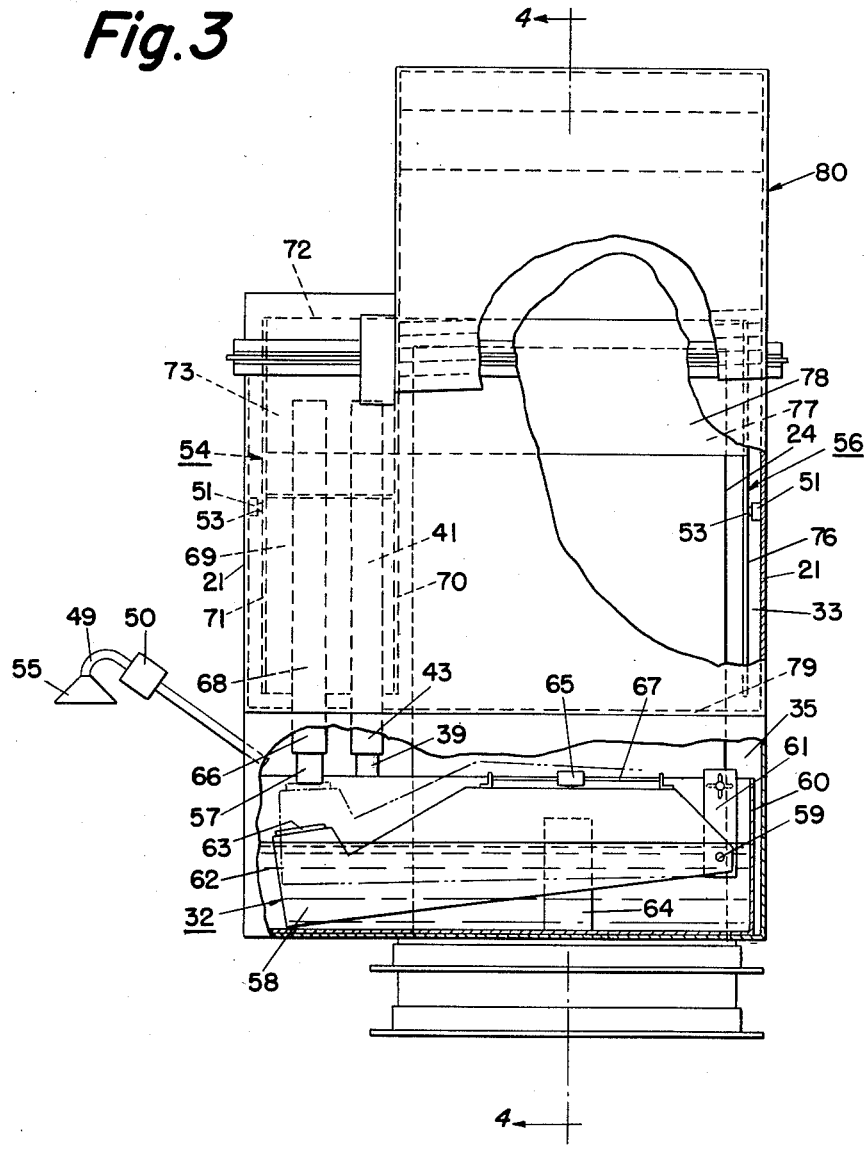
Figure 3 is a side elevational view opposed to Figure 2 partially broken away to show further operating details.
Figure 6:
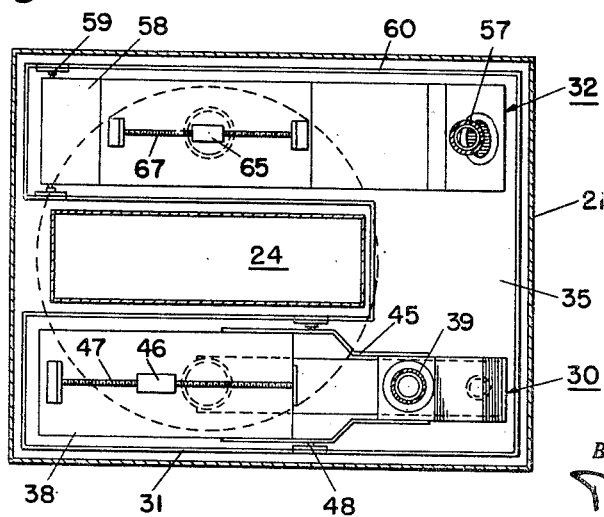
Figure 6 is a sectional view taken on line 6—6 of Figure 4.

A cover plate 26, Figure 2, forming the supporting base of the valve enclosing chamber 33 and the actuator chamber 35 of the housing 21, is apertured to transmit actuating and relieving gas pressure as shown in Figure 6. Figures 4, 5 and 6, taken together with Figures 2 and 3, show the relative positions of these apertures. The actuators associated with certain of these apertures and which control the relief operations are also shown in these figures.

Figure 7:
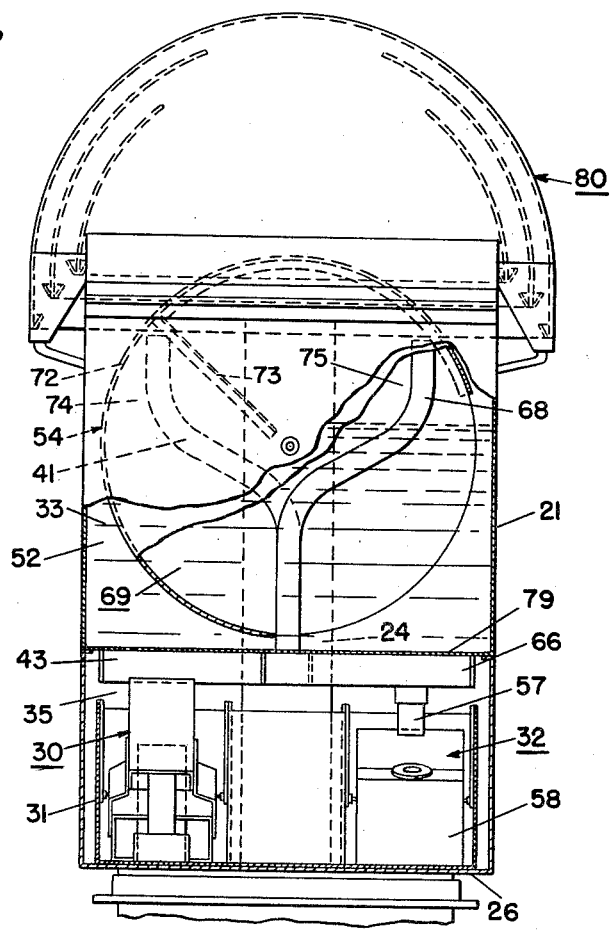
Figure 7 is a sectional elevational view taken on line 7—7 of Figure 2.

The vacuum relief actuator generally designated by the numeral 30 is shown in side elevation in Figure 2. In this figure the two operating positions of this mehcanism are shown in full and phantom lines, distinguishing one position from the other. The pressure relief actuator 32 is shown in elevation in Figure 3, also in full and phantom lines to show the operating positions of the actuating element. Further generally denoted and positioned, these actuating elements, as shown in Figures 4, 6 and 7, will be described in detail relative to the pressure source, and will be connected later to the details of the relieving valve member or housing 21.

Reference to Figs. 2, 4 and 6 in relation with Figure 1 will make clear the structure of the vacuum relief actuator. The vacuum relief actuator generally designated by the numeral 30 is enclosed in a compartment 31 of the actuator chamber 35, which is immediately supported by the cover plate 26 on the right of the relief gas flue 24 as shown in Figure 4. This compartment 31 is adapted to contain a liquid seal 34, indicated in Figure 2, at sufficient depth to cover all pivotal connections. A conduit 36 projects upwardly through and to a point above the sealing liquid 34 into the vacuum responsive first inverted cup 38. A manifold portion 40 connects the conduit 36 to a second upwardly projecting conduit 42 also extending through and above the surface of the sealing liquid 34 into a second inverted cup 44.

Connecting the two inverted cups 38 and 44 of the vacuum actuator 30 in spaced relation one from the other, a support frame 45 is pivotally suspended as at 48 to reciprocate in sealing engagement with the liquid 34. Cup 38 serves the purpose of responding to the vacuum condition transmitted through conduit 36 and moving the second cup 44 into and from vacuum transmitting relation with a connecting conduit 39.

Continued examination of these figures, particularly Figure 2, will show the second inverted cup 44 of the vaccum actuator to be apertured for engagement with the conduit 39 connected with the upper manifold 43 in its lifted position. This aperture 37 is normally peripherally bounded in the form of contact means disclosed in the above referred to application Ser. No. 278,823, now Patent No. 2,710,625, granted June 14, 1955, or other sealing means, to make a sealing contact. Under most operating conditions a soft, rubber gasket properly positioned to engage the end of conduit 39 is sufficient. The unapertured portion of this cup 44 is shaped to engage the sealing liquid 34 over conduit 42, permitting gas passage to the aperture 37 in the raised position, and shutting off this passage when dropped lower in the liquid 34 in the inoperative (phantom line) position. The first inverted cup 38 of this vacuum actuator 30 is not apertured, but remains in liquid sealed engagement enclosing conduit 36 in order to raise and lower the second cup 44 in response to vacuum conditions transmitted to it.

To complete the description of the vacuum relieving components and facilitate the later description of the pressure operating elements, the connecting conduit 41 through manifold 43 will be traced. Referring to Figures 2, 3, 5, 6 and 7, this conduit 41 is shown positioned to engage the inverted cup vacuum responsive actuator 38 through manifold 43 and conduit 39 and extends upwardly through the valve body 21 to branch through the valve liquid seal 52, emerging above its level in the pressure responsive mechanism 54 adapted to move or drive the valve member 56. An additional feature associated with the inverted cup vacuum responsive actuator is the longitudinally adjustable weight 46 threadedly engaging the weight support member 47, later to be described as an operating control element.

In Figure 3, the view is taken from the side opposite to that shown in Figures 1 and 2, and this figure is broken away to show the pressure responsive actuator. As was noted above in describing the vacuum actuator, this figure indicates two operating positions for the pressure responsive actuator member 58 of the generally designated pressure actuator 32 by full and phantom lines. This pressure responsive actuator member 58 is an inverted cup pivotally supported at 59 in a compartment 60. The difference in shape, position of support and function of this inverted cup actuator member 58 over the vacuum member of two inverted cups 38 and 44 will be understood after reading the description of operation later in this specification.

A single cup 58 pivotally supported on one end by the pivot 59 and bracket 61 is in sealing contact with the liquid seal 62 over the conduit 64 which projects into it. This conduit 64 connects the hollow volume of the inverted cup 58 to the storage vessel pressure by opening into the cup above the operating level of the liquid 62. On the upper side of cup 58, in the end opposite the pivotal suspension, an aperture 63 is positioned to engage and disengage conduit connector 57. A contact seal of a type similar to that mentioned above for the contacting cup 44 of the vacuum actuator surrounds this aperture and makes possible good transfer of pressure conditions existing in the cup 58 during relieving operations. A weight 65 threadedly engages a support rod 67 for adjustment purposes, as previously described for the vacuum condition actuator.

In the lower chamber of the system housing 21 referred to generally as the actuator chamber 35, all of which may or may not form the actuator compartments 31 and 60 as desired, it is required that the space above the actuators' sealing liquid, and below the separating partition 79 separating the two chamber 33 and 35, be open to atmospheric pressure. This is accomplished by a pressure transmitting conduit or vent tube 49 shown as bent downwardly to refuse rain and snow in which a desiccant containing section 50 is placed. The flared end 55 is adapted to shed water, relieve back pressures and avoid icing or gumming obstructions.

The conduit connector 57, projecting from the manifold portion 66 to receive the pressure condition, is the means for transmitting the operating pressure to the pressure responsive mechanism 54. Conduit 68, branched oppositely to conduit 41, as shown in Figures 3 and 7, projects upwardly from its connection with manifold portion 66, through the valve sealing liquid 52, into the pressure responsive mechanism 54.

Continued reference to these Figures 3 and 7 will make clear the relative position of the pressure responsive mechanism 54, the valve member 56 and these pressure transmitting conduits 41 and 68 above described. The pressure responsive mechanism 54, in this device, is a longitudinal extension of the valve member 56 and is fastened to, or is an integral part of, that member. Figure 3 clearly shows this tandem construction. The pressure responsive mechanism 54 forms a separate cell or cellular portion 69 extending from the end of the valve member 56 defined by the intermediate plate 70 which is a common divider between the cell 69 and valve member 56, and the end plate 71. Extending for approximately three-quarters of the circumference of these defining plates a peripheral member 72 engages these plates and encloses the chamber. As shown in Figure 7, this leaves a portion of the chamber 69 open to receive the upwardly projecting conduits 41 and 68. This arcuate opening is sufficiently large to permit the valve operating mechanism 54 to rotate, opening and closing the valve 20, and still retain a seal over the conduits by remaining in contact with the sealing liquid. Extending between the cell 69 and plates 70 and 71, and from the peripheral member radially inwardly to the sealing liquid body 52, a baffle 73 divides the sealed-off portion above the liquid into two sections 74 and 75.

Referring back to Figure 3, the valve member 56 occupies the remainder of the valve body extending from the intermediate plate 70 common to both the valve member and the pressure responsive mechanism. Another end plate 76 defines the hollow portion 77 within the valve member further enclosed by a peripheral member 78 extending between these plates. This peripheral enclosing plate 78 is limited, on the valve member, to approximately one-half of the circumference of the limiting plates 70 and 76, as indicated in both the open and closed operating positions in Figure 4. As is evident the reason for this is that although the cover plate 78 need cover no more arc than is necssary to engage the sealing liquid 52 in the closed or normal position over the upwardly projecting end of relief gas flue 24, sufficient operating area of baffle 73 is required. The effective pressure exerted on the valve operator or driver mechanism is directly proportional to the exposed baffle surface. Consequently, the liquid level of sealing liquid 52 is maintained at proper operating level. It will be evident to those versed in the art that such liquid levels as are necessary in the valve and actuator chambers described here can readily be maintained by any one of a number of well known float and reservoir means, omitted here for sake of clarity.

The system housing 21 is designed to receive and support this combined structure of pressure responsive mechanism 54 and valve member 56 in the valve chamber 33 above the actuator chamber 35 by partition 79. Lugs 53—53, or other means such as knife edge bearings, extend from end plates 71 and 76 to engage supports 51—51 respectively. This supporting means is aligned with the axis of rotation of the valve member and responsive mechanism, thereby insuring a normal sealed position responsive to actuating pressure conditions as delivered by the respective actuators.

Under these normal conditions wherein the valve member 56 is in sealing engagement with the liquid 52 over the flue 24 as shown in full line on Figure 4, the internal condition of the storage vessel is sealed. This is also true of the actuators 30 and 32 as will be understood later. Upon the valve member being rotated to the open position for relief of either pressure or vacuum conditions, the flue 24 transmits relieving gases moving either inwardly to correct a vacuum condition, or outwardly to relieve a pressure condition. If a pressure condition is being relieved, the outward movement of pressure gases tends to pick up particles of the sealing liquid, especially at the initial opening position. By providing a hood 80 such as is shown here, and detailed in Figures 4 and 7, the entrained particles of sealing liquid are recovered and other purposes increasing the operating characteristics of the mechanism are served.

The hood, generally denoted by the inclusive numeral 80, is here shown as semi-circular in sectional elevation, which serves to keep the overall silhouette low. A plurality of vanes 81, 82, 83 and 84 are spaced inwardly from the outer shell 85 by spacing bolts 86 or similar means. Each of said vanes is terminated by a V-shaped trough 87, 88, 89 and 90 respectively to receive collected liquid from both surfaces. However, the troughs 91 and 92 terminating the outer shell receive liquid from the inner surface only, refusing the deposit of rain or snow which will frequently cover the hood. These troughs slope to one end of the hood where they empty into covered containers 93 and 94 which are connected by pipes 95 and 96 respectively to the inside of the valve body 21.

Operation of the detailed device will be described for both vacuum and pressure relief conditions. Reference will be made to all the figures of the drawing, selecting the most pertinent one for each condition. At this point, it will be realized that even though the vacuum position for the movable elements is illustrated in the drawing, judicious use of phantom lines and dotted position will make the pressure relief position intelligible as well as the normal or sealing position.

Starting from the sealed or normal position, it will be realized that this valve mechanism is serving one of its most important purposes. Under the requirements of this condition, the vacuum actuator 30 in Figure 2 is in the position shown in phantom line with the second inverted cup 44 disconnected from conduit 39. Both cups 38 and 44 are in balance about the pivot 48 sealing conduits 36 and 42. Disengaged conduit 39 is open to transmit atmospheric pressure which is constantly admitted to the space above the actuators, to the valve operator or driver 54 through conduits 39, 43 and 41. The sealed-off section 74 of the operator 54 is under atmospheric pressure.

This condition also requires that the pressure actuator 32 be resting in the sealing liquid 62 in sealing engagement with conduit 64 as shown in full lines in Figure 3. The conduit 57 is disengaged and the ever-present atmospheric pressure is transmitted through conduits 57, 66 and 68 to the sealed off section 75 of the operator 54. Thus this driving element 54 is balanced by atmospheric pressure on both sides of the baffle 73 which will assume a position about 90° from the position shown in Figure 7 or substantially in contact with conduit 68. The valve member 56 will then be in sealing engagement with the liquid seal 52 over the open end of flue 24 as indicated in full line in Figure 4.

Under these conditions, pressure connection between the storage vessel 22 and the operating mechanism for the relief valve is broken. With the exception of the hollow portion 77 of the valve member 56 and the hollow portions of the inverted actuator cups 38, 44 and 58, the valve combination is subjected, externally and internally, to atmospheric pressure. Of these areas subjected to the pressure conditions of the storage vessel to which the device is attached, the actuators alone are responsive. The valve member 56 remains immovable, sealing flue 24, until it is rotated to venting position by operation of the actuators transmitting selected vacuum or pressure forces to the operator 54. By carefully adjusting the weights 46 and 65 the operating force required to move the actuators can be established at a carefully predetermined setting.

Considering that this operating adjustment is made on the actuators, the effect will be described for the vacuum responsive condition first. Figures 2, 4 and 7 will make clear the relief of this condition. By decreasing the pressure supporting the first cup 38 of the vacuum actuator 30, the effect of atmospheric pressure above the sealing liquid 34 is to pivotally move this cup downwardly. This is clear when it is understood that the relative volume of the first cup is much larger than the second cup 44 and consequently controls the second cup. The position assumed is that shown in full line in Figure 2 having moved from the phantom line indicated position.

Contact is made through the aperture 37 in the second cup 44 which transmits the existing vacuum condition thereto. Through conduits 39, 43 and 41, this negative pressure condition is released into the previously balanced valve operator or driver 54. As the baffle 73 preserves two separately sealed off sections 74 and 75, only one of these, 74, is subjected to a negative pressure condition.

As the pressure actuator cannot move upwardly under vacuum conditions but is held more firmly in place (Fig. 3), the pressure transmitting conduit system, conduits 57, 66 and 68, is open to convey atmospheric pressure only. This pressure fills the space 75 opposite to 74 on the other side of baffle 73 and moves the valve operator counterclockwise looking at Figure 7. The valve member 56 is rotated to the open position over the flue 24, as shown by phantom line in Figure 4. This breaks the seal between the valve member 56 and the liquid 52 admitting gases inwardly of flue 24 to relieve the vacuum condition.

When this condition no longer exists, the actuator is released, also selectively controlled by the position of weight 46, and returns to the sealing position shown in phantom line in Figure 2. The operating pressure being broken and the operator 54 suddenly filled on both sides of the baffle with equally distributed atmospheric pressure fed through conduits 41 and 68, the valve operator quickly, and without chatter, moves the valve member 56 to the sealed position.

In a pressure relieving situation, the condition arising in the storage vessel as indicated above, the pressure actuator 32 of Figure 3 becomes effective. The actuator cup 58 receives pressure in the open space within the cup above the liquid through conduit 64. It is lifted, as shown by phantom line, into engagement with conduit 57. Aperture 63 makes sealing contact with the conduit and the pressure condition starting the operation is transmitted through conduits 57, 66 and 68 to section 75 of the valve operator 54. As section 74 is opened to the vacuum actuator 30 which is being kept from closing into engagement with conduit 39, atmospheric pressure alone is transmitted to this compartment. As a result, the pressure condition effectively pushes the baffle 73 rotating the operator 54 and the valve 56 in the counterclockwise direction (Fig. 7) to relieve the pressure condition.

It will be noted that this is the same direction of movement required to relieve the vacuum condition. In both conditions the greater of two differential pressures, vacuum-atmosphere, atmosphere-pressure, always arises in the same section 75. As a result of this constant direction of relieving movement the valve member 56 can be perfectly balanced to give outstanding operation.

As the valve member uncovers the flue 24 to relieve the pressure condition, the escaping gas boils the surface of the sealing liquid, lifting particles thereof in entrainment. The gas moves upwardly to encounter the hood 80 and then is directed, sharply to escape between the arcuate vanes. This sudden change of direction and effective area of deflecting surface interrupts the liquid suspension and causes droplets to be deposited. The outward rush of gas, under these pressure relieving conditions, urges the accumulated moisture to follow the surface of the vanes. Once over the crest, the accumulated moisture continues to follow the vanes until it is collected in the already described V-shaped troughs. It is then returned to the body of the sealing liquid through the receiving receptacles 93 and 94, and thence through pipes 95 and 96.

The pressure condition having been relieved, the return to the normal sealing position starts, as noted above for the vacuum condition, with the release of the actuator. Pressure actuator 32, when no longer supported by the predetermined pressure condition in contact with conduit 57, resumes the position shown in full line in Figure 3. Atmospheric pressure is admitted to conduit 57 immediately on breaking the transfer connection. As the section 74 is under atmospheric pressure due to the inactivity of vacuum relief actuator 30, the valve operator 54 is immediately and completely balanced. Valve member 56 is returned to the normal, sealed position.

The above description of the operation of the combined mechanism stresses the separate operating elements of the device and their relationship. The normal balance, adjustable response to both vacuum and pressure, and pressure operation by predetermined conditions arising in the vessel to be relieved, illustrate a desirable combination. Such a device reduces mechanical elements to a minimum and entirely removes connecting members.

It will be evident that the elements, sub-combinations and combination here shown can be rearranged and substitutions made within the scope of the invention without changing the spirit thereof. It is the intention of the inventor to be limited only by the claim which follows and is a part of this application.

What is claimed is:

A pressure venting system for use with liquid storage vessels comprising a hooded housing partitioned into upper and lower chambers open to receive atmosphere and adapted to contain sealing liquid; a relief gas flue extending vertically through the chambers to terminate above the liquid level in said upper chamber; a rotatable hollow valve member positioned in the upper chamber in sealing engagement with the liquid therein over the relief gas flue; a pressure responsive means connected to said valve member in the upper chamber; two normally disengaged conduits one to conduct pressure operating conditions, and the other to transmit vacuum operating conditions, from the lower chamber to the pressure responsive means; two inverted cup pressure operated actuating means in the lower chamber in sealing liquid engagement, one operatively responsive to pressure conditions being a single inverted cup pivotally positioned to lift into engagement with the transmitting conduit in response to pressure and to depress from engagement in response to vacuum conditions as these conditions are transmitted into the pressure responsive cup from the storage vessel, and the other cup means responsive to vacuum conditions including a pair of spaced apart inverted cups pivoted therebetween, one cup apertured and arranged to lift to vacuum transmitting engagement with the vacuum transmitting conduit in response to the vacuum effect transmitted from the storage vessel to the second and non-apertured cup of the pair.

References Cited in the file of this patent

UNITED STATES PATENTS

| 1,727,785 | Roth | Sept. 10, 1929 |
| 1,901,576 | Atwell | Mar. 14, 1933 |
| 2,457,763 | Wiggins | Dec. 28, 1948 |
| 2,710,625 | Quist | June 14, 1955 |

FOREIGN PATENTS

| 516,228 | Great Britain | of 1939 |